Patented Oct. 14, 1924.

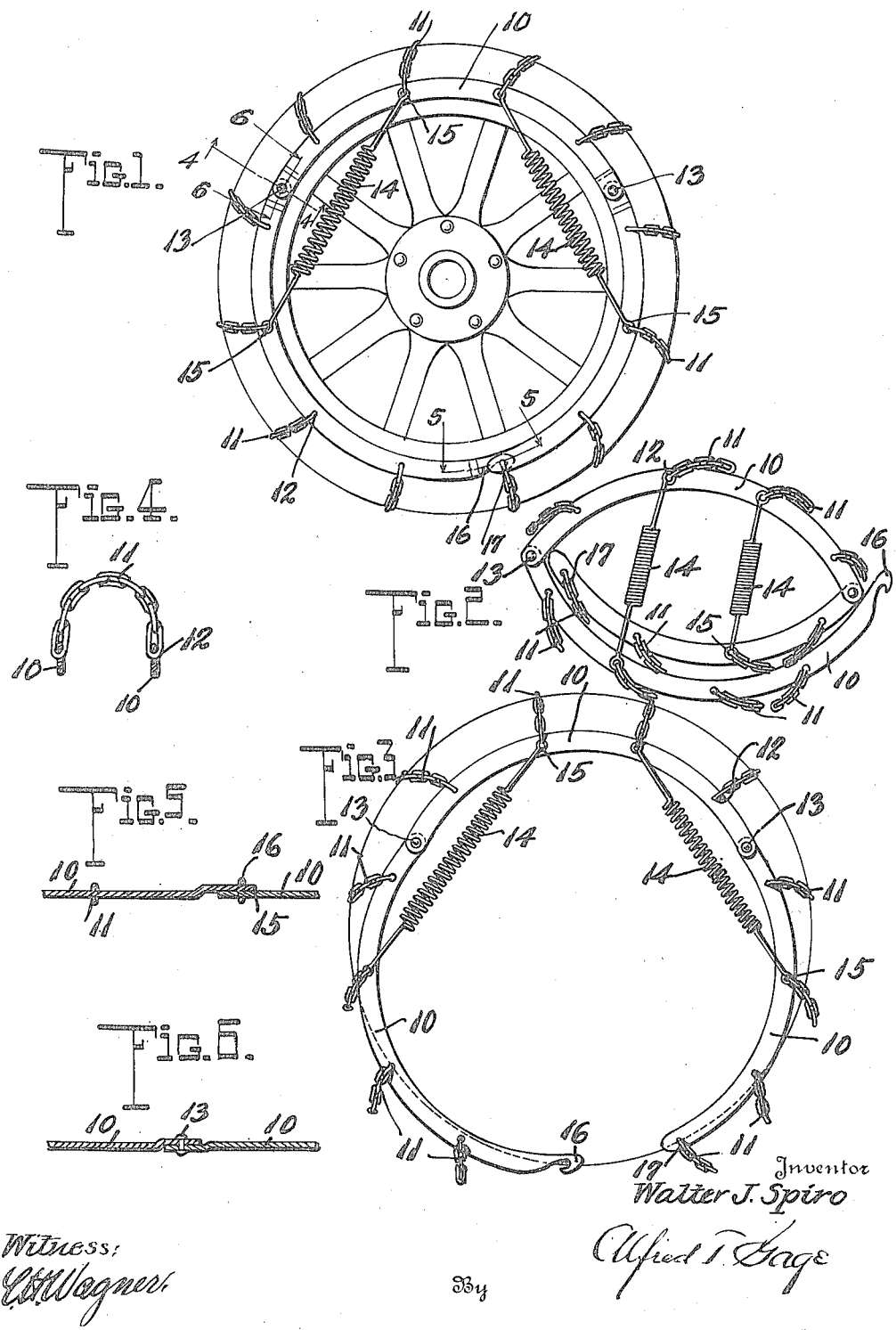

1,511,685

UNITED STATES PATENT OFFICE.

WALTER J. SPIRO, OF WHITE PLAINS, NEW YORK.

TIRE-CHAIN HOLDER.

Application filed April 23, 1924. Serial No. 708,448.

*To all whom it may concern:*

Be it known that I, WALTER J. SPIRO, citizen of the United States, residing at White Plains, in the county of Westchester and State of New York, have invented certain new and useful Improvements in Tire-Chain Holders, of which the following is a specification.

This invention relates to a tire chain holder and particularly to a construction adapted to be automatically fitted to a wheel tire and retained thereon.

In the application of the ordinary tire chains it is necessary to lay the chain upon the ground or tire and to move the wheel to permit the ends of the side chains to be brought together and manually secured. This is a very objectionable operation in bad weather or on soft ground and requires considerable time to properly fit and connect the free ends of the chains. The present invention provides a chain holder which is simply opened and laid over the tire so that its open ends are automatically drawn together and fitted to the tire in the rolling movement of the wheel.

The invention has for an object to provide a novel and improved construction comprising a plurality of pivoted sections normally held in annular form by tension means and carrying tread chains so that the entire holder is automatically fitted in position and adapted to creep upon the tire as it is not secured to any part of the wheel strucure.

Another object of the invention is to present a new construction of chain holder comprising foldable sections each carrying tread chains and springs connecting said sections and extending across the pivotal line thereof to normally draw the sections toward each other.

A further object of the invention is to provide a novel connection at the free ends of the pivoted sections by which they will be automatically connected and held against accidental opening by centrifugal force or other causes.

Other and further objects and advantages of the invention will be hereinafter set forth and the novel features thereof defined by the appended claims.

In the drawing—

Figure 1 is a side elevation of the invention applied;

Figure 2 is a similar view with the parts folded;

Figure 3 is an elevation showing the application of the holder;

Figure 4 is a detail section on line 4—4 of Figure 1;

Figure 5 is a similar view on line 5—5 of Figure 1; and

Figure 6 is a section on line 6—6 of Figure 1.

Like numerals refer to like parts in the several figures of the drawing.

In the form of the invention herein disclosed the holder comprises three sections, but more or less may be used as found desirable and the size and configuration thereof likewise changed. The sections are substantially similar in construction and may comprise curved or segmental rods or bars 10 adapted to be disposed at opposite sides of the tire and connected by any preferred form of tread chains 11 which are secured at apertures 12 in the bars. The abutting ends of two sections are pivoted to the intermediate section by offset ends, as at 13, and these swinging sections are connected with the intermediate section by the coiled tension springs 14 engaging the chain links at 15 and extending chordal of the joints between the sections. These springs normally draw and hold the sections in annular form when applied to a tire and are relieved and compressed when the sections are folded as in Figure 2. The free ends of the two pivoted sections are disposed to overlap, and one is formed with an offset hook 16 disposed to engage the connecting link of the chain 17 at the end of the abutting section which causes the parts to interlock, thus automatically securing the holder in position.

To attach the chain the holder is opened, slipped over the tire, and when released the springs will draw the open ends together until they strike the road, as indicated in Figure 3. The initial movement of the wheel forces the left free end into contact with the tire and the continued rotation brings the opposite free end into locking contact therewith, thus fitting and securing the holder upon the tire without the need of manual operation. When it is desired to remove the holder the free ends are opened and one part drawn to the outside of the tire and the rotation of the wheel will remove the tire from the holder. The parts are adapted to be closely folded for transportation or storage and the retracting tension of the springs assists in such folding operation. The side bars forming the holder provide a firm support for the chains and permit a proper creeping movement thereof upon the tire which is important in this class of antiskid chains.

The specific construction of the springs and other parts has been disclosed in this application but the invention is not confined thereto as changes and alterations may be made therein without departing from the spirit of the invention as recited in the following claims.

What I claim is—

1. In a tire chain holder, a series of rigid segmental chain carrying sections pivoted together and normally tensioned inwardly toward each other to closely embrace a tire.

2. In a tire chain holder, a series of chain carrying sections pivoted together and normally tensioned toward each other, and automatically interlocking means disposed at the free ends of said sections.

3. A tire chain holder comprising a series of rigid segmental pivoted sections foldable upon each other and provided with tension means to retain the same in annular position upon a tire.

4. In a tire chain holder, a series of curved bars connected by tread chains and pivoted together to form opposite swinging sections and an intermediate connecting section, and tension springs extending between said sections chordal to the pivots thereof.

5. In a tire chain holder, a series of pivoted bars connected by tread chains and forming swinging sections with an intermediate connecting section, tension springs connecting said sections to draw the same toward each other, and interlocking means upon the free ends of the swinging sections.

6. In a tire chain holder, a series of pivoted bars connected by tread chains and forming swinging sections with an intermediate connecting section, tension springs connecting said sections for drawing the same toward each other, and a hooked end upon one of the swinging sections to engage interlocking means upon the opposite section.

In testimony whereof I affix my signature.

WALTER J. SPIRO.